Aug. 26, 1952   B. G. FRUITHOF   2,608,605
DEVICE FOR UNDERTAKING LOSS-ANGLE MEASUREMENTS
Filed July 16, 1946
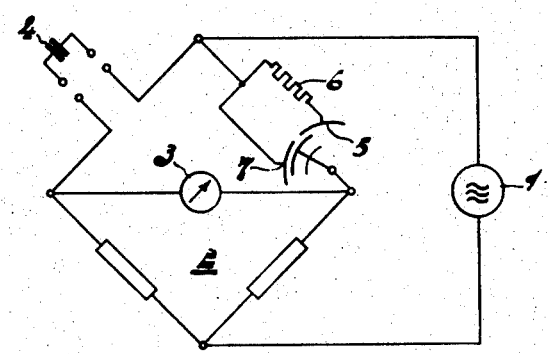
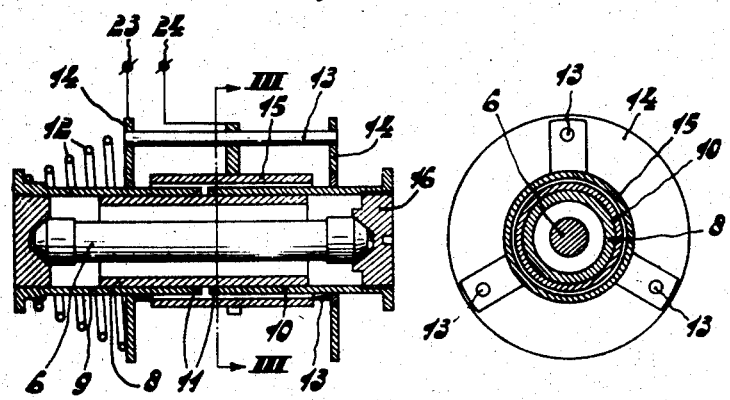
INVENTOR
BAREND GERRIT FRUITHOF
BY
ATTORNEY

UNITED STATES PATENT OFFICE 2,608,605

DEVICE FOR UNDERTAKING LOSS-ANGLE MEASUREMENTS

Barend Gerrit Fruithof, Eindhoven, Netherlands, assignor to Hartford National Bank and Trust Company, Hartford, Conn., as trustee Application July 16, 1946, Serial No. 684,084
In the Netherlands May 31, 1943

Section 1, Public Law 690, August 8, 1946
Patent expires May 31, 1963

5 Claims. (Cl. 175—183)

This invention relates to a device for carrying out loss-angle measurements on reactances, which contains a variable comparison impedance included in a measuring bridge circuit, and also to a favorable constructional form of the comparison impedance to be used in it.

For carrying out loss-angle measurements, particularly at high frequencies, for example $10^6$ c./sec., it is known to constitute the variable comparison impedance in the bridge circuit by the series combination of a resistance and a variable condenser or else generally by a variable reactance.

Such a measuring-bridge circuit, however, has the disadvantage that as the loss angle of the comparison impedance is adjusted its reactive component varies as well.

According to the invention, it is possible to obviate this disadvantage in the case of measuring bridge circuits of the type described by the use of the comparison impedance which in addition to the series combination of a resistance and a variable reactance contains a second variable reactance of identical type as the first-mentioned variable reactance, which shunts the series combination.

Practically, the two variable reactances are so variable concurrently in opposite senses, for example by reference to calibration curves, a suitable scale division, that the reactive component of the comparison impedance is independent of the adjustment.

The variable reactances may be constituted either by inductances or by condensers. In the latter case, a most favorable embodiment of the device and the comparison impedance according to the invention is obtained by uniting the two condensers to form a differential condenser and if the sum of the capacities of the two sections of the differential condenser is independent of its adjustment, the reactive component of the comparison impedance is not absolutely constant on variation of the adjustment of the differential condenser, but the divergences occurring, particularly in the case of high frequency measurements, are practically negligible.

In order that the invention and the advantages of the variable impedance of capacitative nature according to the invention may be clearly understood and readily carried into effect it will now be described more fully with reference to the accompanying drawing, in which Fig. 1 shows the circuit arrangement of a device according to the invention in which a comparison impedance of capacitative nature is used;

Figs. 2 and 3 are a longitudinal and a cross-sectional view respectively of a favorable constructional form of a variable comparison impedance according to the invention, whereas;

Fig. 4 shows a comparison impedance of inductive nature for use in the case of loss-angle measurements on inductances in the device according to the invention.

The device shown in Fig. 1 comprises a measuring bridge circuit 2 which is supplied from a high-frequency alternator 1 and which comprises a zero indicator 3. One of the arms may include the object of measurement, in this instance a condenser 4, whereas a neighboring arm contains the comparison impedance, which is constituted by the series combination of a variable condenser 5 and a fixed resistance 6 and in addition by a variable condenser 7 by which the said series combination is shunted. The condensers 5 and 7 form the sections of a differential condenser so that the sum of the capacities of the two sections is independent of the adjustment of the differential condenser. Thus, as the differential condenser is adjusted practically, only the real part of the comparison impedance varies, and thus its loss angle, without a bridge balance already adjusted being disturbed and this considerably assists the loss-angle measurements to be undertaken.

For the purpose of securing a comparison impedance particularly suitable for the present purpose the differential condenser, which may be of a type known per se, is constructionally united, preferably in the manner shown in Figs. 2 and 3, with the resistance 6 to form a compact component member. The relatively isolated electrodes of the differential condenser are constituted by two aligned cylinders 9, 10 clamped on to a small ceramic tube 8. The adjacent edges of the electrodes 9 and 10 are so bevelled at 11 that their spacing on the axis side is comparatively large at the minimum permissible spacing along the exterior so that a relatively large leakage path is set up between the electrodes.

The electrodes 9, 10 are slidable in the direction of the axis, for example by means of a micrometer screw (not shown), in a frame which is made up of rods 13 and plates 14, and which also supports the electrode 15 common to the two sections of the differential condenser. This electrode 15 is also cylindrical and concentrically surrounds the other electrodes.

The resistance 6 whose ends must be connected to the electrodes 9 and 10 respectively is housed inside the cylinder formed by these electrodes so that connecting conductors interfering with the measurement are avoided. After removal of a screw cap 16 the resistance 6 can be withdrawn and replaced by another.

In a measuring bridge circuit according to the invention comprising a comparison impedance constructed as shown in Figs. 2 and 3 the parallel impedance of the comparison impedance varies, at a measuring frequency of about 1.5 mc./sec., between 0.5 and 25 megohm, if the resistance 6 has a value of 150 ohm, the total capacity of the differential condenser is about 15 pF and the variation of the section capacities is about 8 pF.

In the case of loss-angle measurements on inductances use may be made of the comparison impedance shown in Fig. 4. It comprises a coil 18 which is provided with a mid-point tapping 17 and has its ends 19, 20 connected to the ends of the resistance 21. The end 19 of the coil is also connected to one end of an auxiliary coil 22 arranged concentrically within the coil 18 and slidable in the direction of the axis. The free end 23 of the auxiliary coil 22 and the mid-point tapping 17 constitute the connecting terminals of the comparison impedance. In the case of the arrangement shown displacement of the coil 22 has not the effect of altering the sum of the mutual inductances between the two halves of the coil 18 on the one hand and the auxiliary coil 22 on the other hand, so that, similarly to the capacitative comparison impedance described, only the real component of the comparison impedance varies.

What I claim is:

1. Apparatus for measuring the loss angle of reactances comprising a four-arm impedance bridge circuit, one arm of said bridge including the reactance under test, another arm of said bridge including an adjustable comparison impedance network having a pair of variable reactances and a resistance connected in series with one of said reactances across the other of said reactances, means to apply an alternating voltage across one pair of opposing vertices of said bridge circuit, and voltage indicating means connected across the other pair of opposing vertices of said bridge, said reactances being differentially variable whereby the total reactance of said network is substantially independent of the adjustment thereof.

2. Apparatus for measuring the loss angle of reactances comprising a four-arm impedance bridge circuit, one arm of said bridge including the reactance under test, another arm of said bridge including an adjustable comparison impedance network having a pair of variable reactances and a resistance connected in series with one of said reactances across the other of said reactances, said reactances being simultaneously variable in the opposite sense, means to apply an alternating voltage across one pair of opposing vertices of said bridge circuit, and voltage indicating means connected across the other pair of opposing vertices of said bridge, said reactances being differentially variable whereby the total reactance of said network is substantially independent of the adjustment thereof.

3. Apparatus for measuring the loss angle of reactances comprising a four-arm impedance bridge circuit, one arm of said bridge including the reactance under test, another arm of said bridge including an adjustable comparison impedance network having a pair of variable reactances and a resistance connected in series with one of said reactances across the other of said reactances, said reactances being concurrently variable to the same extent in the opposite sense whereby the reactive component of the comparison impedance network is substantially independent of the adjustment thereof, means to apply a high frequency voltage across one pair of opposing vertices of said bridge, and a high frequency zero-indicating voltmeter connected across the other pair of opposing vertices.

4. Apparatus for measuring the loss angle of capacitors comprising a four-arm impedance bridge circuit, one arm of said bridge including the capacitor under test, another arm of said bridge including an adjustable comparison impedance network having a pair of variable capacitors and a resistance connected in series with one of said capacitors across the other of said capacitors, said capacitors being concurrently variable to the same extent in the opposite sense whereby the reactive component of the comparison impedance is substantially independent of the adjustment thereof, means to apply a high frequency voltage across one pair of opposing vertices of said bridge, and a high frequency zero-indicating voltmeter connected across the other pair of opposing vertices.

5. Apparatus for measuring the loss angle of capacitors comprising a four-arm impedance bridge circuit, one arm of said bridge including the capacitor under test, another arm of said bridge including an adjustable comparison impedance network having a pair of variable capacitors and a resistance connected in series with one of said capacitors across the other of said capacitors, said capacitors being concurrently variable to the same extent in the opposite sense whereby the reactive component of the comparison impedance is substantially independent of the adjustment thereof, means to apply a high frequency voltage across one pair of opposing vertices of said bridge, and a high frequency zero-indicating voltmeter connected across the other pair of opposing vertices, said pair of variable capacitors being formed by a tubular electrode and a pair of cylindrical electrodes concentrically disposed in spaced axial alignment within said tubular electrode, said cylindrical electrodes being axially slidable within said tubular electrode thereby to vary inversely the capacitance between each of said cylindrical electrodes and said tubular electrode.

BAREND GERRIT FRUITHOF.

REFERENCES CITED

The following references are of record in the file of this patent:

UNITED STATES PATENTS

| Number | Name | Date |
|---|---|---|
| 1,651,440 | Campbell | Dec. 6, 1927 |
| 1,847,127 | Mayer | Mar. 1, 1932 |
| 2,093,103 | Taborsky | Sept. 14, 1937 |
| 2,108,766 | Fischer et al. | Feb. 15, 1938 |
| 2,178,617 | Stein | Nov. 7, 1939 |
| 2,265,042 | Lundry | Dec. 2, 1941 |
| 2,329,098 | Browning et al. | Sept. 7, 1943 |
| 2,376,394 | Sinclair | May 22, 1945 |
| 2,395,623 | Goldstein et al. | Feb. 26, 1946 |

FOREIGN PATENTS

| Number | Country | Date |
|---|---|---|
| 336,313 | Great Britain | Oct. 16, 1930 |
| 106,680 | Australia | Feb. 17, 1939 |